INVENTOR.
ROBERT T. COLLIER
BY Naylor & Neal
ATTORNEYS

May 5, 1970 R. T. COLLIER 3,509,637
METHOD AND APPARATUS FOR TREATING AND STORING NODULAR ARTICLES
Filed April 12, 1968 4 Sheets-Sheet 4

INVENTOR.
ROBERT T. COLLIER
BY Naylor & Neal
ATTORNEYS

United States Patent Office 3,509,637
Patented May 5, 1970

3,509,637
METHOD AND APPARATUS FOR TREATING AND STORING NODULAR ARTICLES
Robert T. Collier, P.O. Box 158, Escalon, Calif. 95320
Filed Apr. 12, 1968, Ser. No. 720,927
Int. Cl. F26b 9/04, 25/14
U.S. Cl. 34—22                                       9 Claims

ABSTRACT OF THE DISCLOSURE

The method is concerned with the drying and storage of in-shell nuts, or other nodular articles, in disposable bag or carton-like containers. In the method, a container is first erected with the upper portion thereof in open condition. A hot air heating conduit is then positioned within the container to discharge into its lower portion. Once the conduit is positioned, articles to be dried are loaded into the container around the conduit. The conduit is then activated to force hot air into the lower portion of the container, from whence it passes upwardly around the articles and vents through the open upper portion. After the hot air has dried the articles to the desired degree, the heating conduit is removed and the container is sealed. The method may also include additional steps, such as charging the container with an inert or fumigating gas.

The apparatus comprises heating conduit and container constructions suitable for employment in the method. One of the heating conduit constructions employs a permeable umbrella-like construction adapted to be selectively expanded and contracted within the confines of a container. In use, this arrangement is expanded prior to the loading of articles into a container to provide a permeable chamber beneath the articles into which air may be discharged for uniform distribution. The arrangement is contracted during withdrawal of the heating conduit to facilitate its removal. The container constructions comprise bags or cartons provided with arrangements to facilitate the receipt of heating conduits and the distribution of hot air therethrough. Certain of the container constructions also include valving arrangements to provide for the selective charging and purging of gas after their sealing.

---

The present invention relates to the drying and storage of in-shell nuts and other nodular articles, and their treatment by subjection to special atmospheres, such as fumigating or inert gases. It is especially concerned with the provision of a single disposable container which may be employed to contain the articles for such drying, storage, treatment and even transportation, without the necessity for removal therefrom.

The most relevant prior art to the present invention is believed found in the art relating to the treatment of hulled walnuts prior to final processing. In this art, hulled walnuts are dried to a moisture content of from 4% to 6% by the circulation of air having a temperature of no more than 110° F. therearound. This limited temperature is employed to prevent deterioration of the oil in the nut meat. Early efforts in this art effected drying in permanent bins through which warm air was forced for a period of twelve to twenty-four hours. This type of drying required that the nuts be removed from the bins and sacked, boxed or placed in bulk trucks for delivery to the final processor. More recent efforts in this art have employed steel bins of portable character which are adapted for shipment to the final processors with the nuts dried therein. These bins generally have a capacity of 100 cu. ft. and an empty weight of about one-half ton. They comprise a simple open topped receptacle having an inclined bottom of screen-like construction and a discharge door in the wall thereof immediately above the lower extremity of the bottom. To effect drying, these bins are placed over forced hot air ducts opening through specially provided support surfaces therefor.

Both of the aforementioned prior art bin arrangements have the disadvantage that they require extensive and permanent facilities. While the arrangement employing portable steel bins avoids the necessity of removal and handling of the nuts prior to delivery to the final processor, it does not obviate the necessity of providing special support surfaces for drying, and of providing for the transport of relatively heavy bins to and from the final processor. The steel bin arrangement also has the disadvantage that it requires a relatively large inventory of steel bins and that it makes no provision for the segregation and storage of nuts after delivery to the final processor.

Certain prior art drying arrangements have also suggested the use of drying containers mounted directly on vehicular wagon-like frames. While some of these have employed light cloth-like wall structures, and thus obviated the weight disadvantage of the steel bin arrangements, they have not avoided the other disadvantages inherent with the steel bin arrangements. In particular, they have not provided for the segregation and storage of nuts after delivery to the final processor.

In summary, the method of the present invention may be said to reside in the steps of providing a substantially impermeable container having an upper portion through which articles may be charged and gas may be vented; inserting a tubular dehydrating gas conduit into the container so as to locate its discharge end adjacent the bottom of the container; introducing the articles to be dried into the container through the upper portion thereof; introducing dehydrating gas into the container through the conduit whereby gas is discharged into the lower portion thereof and flows upwardly around the nodular articles received therein; withdrawing the conduit from the container; and, sealing the container to substantially prevent the ingress of gas thereinto or the egress of gas therefrom. While the method may include other steps, these are basic to its practice.

The gas introducing apparatus of the invention comprises, in summary, a vertically disposed hot air conduit; and a permeable umbrella concentrically secured to and extending around the conduit. The conduit is provided with an open lower discharge portion and the umbrella is secured above the portion for selective movement between an opened condition extending laterally from and around the conduit and a closed condition extending downwardly and longitudinally relative to the conduit.

The remaining apparatus of the invention is believed adequately summarized in the foregoing abstract. This apparatus is concerned with containers for use in the inventive method which provide self-incorporated valving, sealing and/or air distribution structure.

As compared to the prior art, the present invention is advantageously characterized in that it provides a method and apparatus wherein:

(1) No permanent drying bins of the stationary concrete type or portable steel type are required;

(2) Dried articles may be stored indefinitely in the containers within which they are dried;

(3) Dried articles are not subjected to repeated handling and resultant damage between the time of their drying and final processing;

(4) Dried articles may be segregated according to their source up to the point of final processing, without the necessity of transfer to special packaging containers after drying;

(5) Relatively small businesses (e.g. walnut growers) can afford to own drying equipment;

(6) The expense inherent with the owning of large inventories of steel bins of the type shown in the prior art and the transport of the same is avoided; and, (7) Dried articles may be stored in a fumigating or inert atmosphere within the same container employed for drying thus satisfying anticipated government regulations directed to the handling of foodstuffs.

These and other advantageous characteristics of the invention will become more apparent from the following detailed description when viewed in light of the accompanying drawings, wherein.

Figure 1:
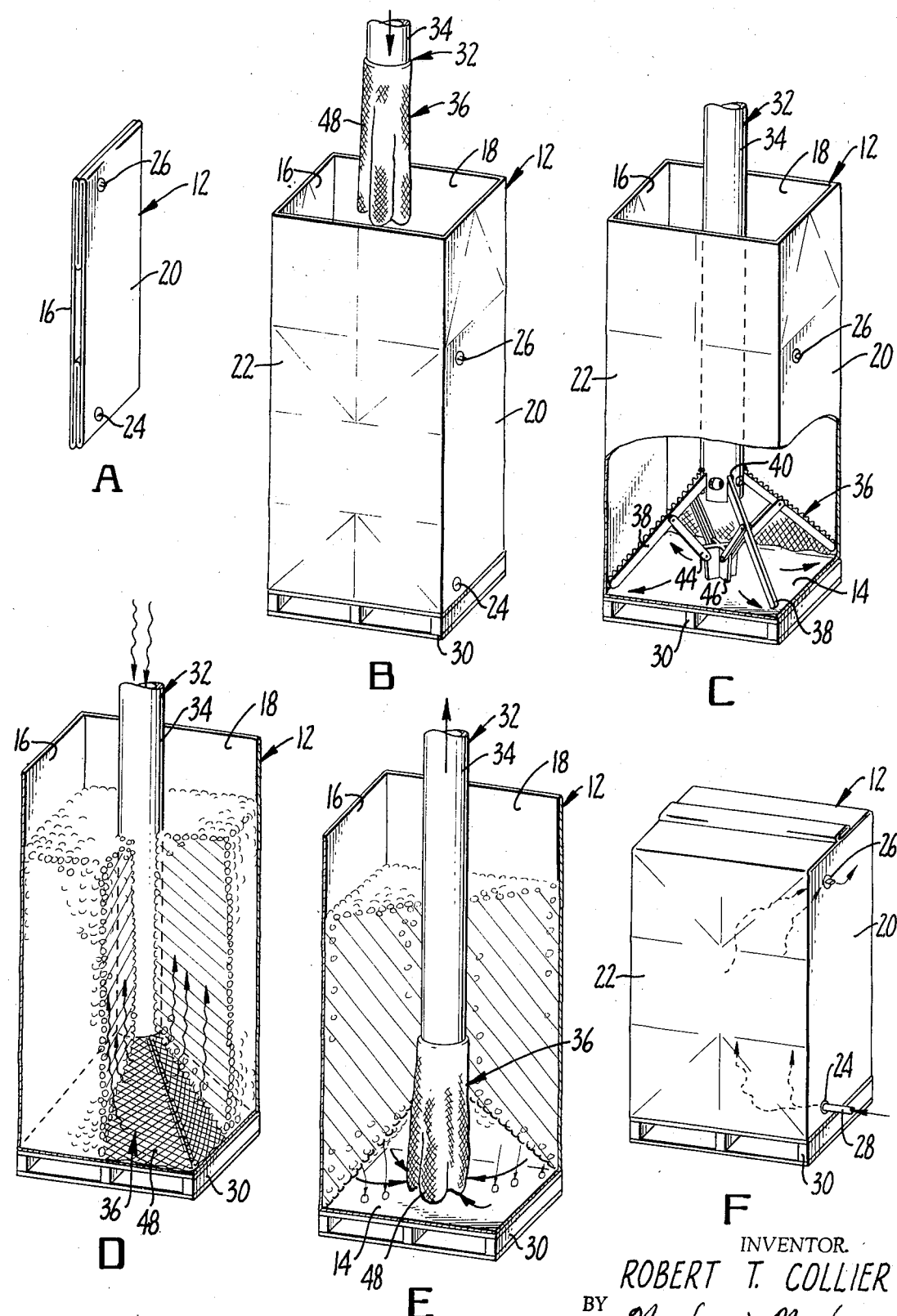
FIG. 1 is a perspective view sequentially illustrating the steps of the method.

Referring now to the apparatus of FIGS. 1–5, the container therein is of a collapsible bag-like construction and designated by the numeral 12. It comprises a bottom wall 14 having upwardly extending contiguous side walls 16, 18, 20 and 22 peripherally secured thereto. These walls are disposed for foldable collapse in shopping bag-like manner along the crease lines illustrated in FIG. 1–B so that the container may be collapsed into the flat condition illustrated in FIG. 1–A. The upper portions of the side walls are provided with diagonal crease lines so that they may be folded downwardly to close the container, as illustrated in FIG. 1–F. When the container is in the collapsed condition illustrated in FIG. 1–A, these upper portions are folded inwardly. This explains the corresponding appearance of the top and bottom portions of the container in FIG. 1–A.

Figure 5:
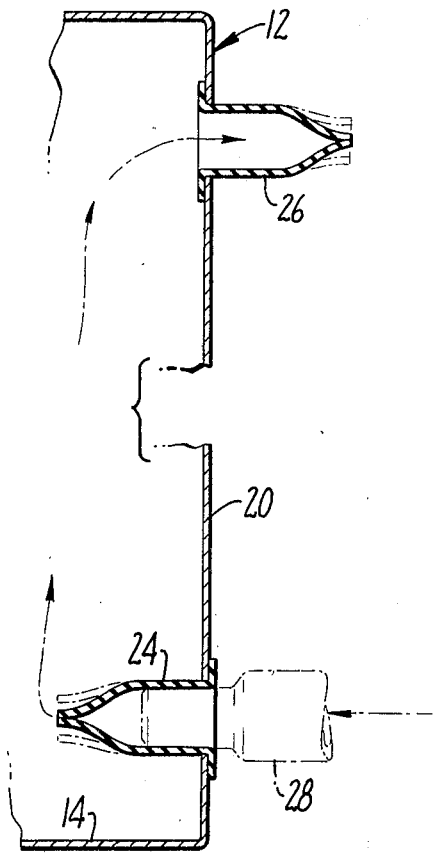
FIG. 5 is a partial elevational view, in section, illustrating the valving apparatus employed for introducing and purging fumigating or inert gases.

As illustrated, the container 12 also has charging and purging valves 24 and 26, respectively, incorporated into the side walls 20. These valves are of conventional "slit-sock" construction and fabricated of rubber or a like material. They are each sealingly received in an opening provided therefore in the wall 20 and, in effect, define a check valve conduit through the wall. The charging valve 24 is positioned in the lower portion of the container and disposed to permit the select introduction of gas, while preventing the discharge of gas. The valve 26 is disposed in the upper portion of the container so as to be located near its upper extremity when closed (see FIG. 1–F), and positioned to permit the pressure differential discharge or purging of gas, while preventing the introduction of gas. The phantom line representations in FIG. 5 illustrate the operation of the valves. While a gas charging conduit, designated by the numeral 28, is shown inserted into the valve 24, it is to be understood that opening of the valve is effected responsive to pressure differential.

The container 12 is preferably fabricated of a strong waterproof material, such as heavy plastic coated or impregnated paper. It may also be fabricated of a polyvinyl sheet material, such as polyethylene. Ideally, it is proportioned so as to measure 4 ft. by 4 ft. in cross-section and 6 ft. in height when in expanded closed condition (see FIG. 1–F). With these proportions, the container is well suited for palletized handling and designed to hold approximately one ton of hulled walnuts. It should be understood, however, that the construction of the container is not limited to these proportions or a parallelpiped configuration. The container is shown supported on a conventional pallet, designated by the numeral 30, in FIG. 1–B to F. In the preferred form, the container 12 is supplied to the user with the bottom sealed in closed condition and a suitable sealing means provided for closure of its top. The latter means may take any number of forms, such as a preapplied contact adhesive or a separately supplied adhesive tape.

The hot air introducing apparatus shown in FIGS. 1–4 is designated, in its entirety, by the numeral 32. This apparatus comprises, as its basic element, a generally vertically disposed tubular conduit 34 having an upper end adapted to be secured in fluid communication with a source of forced hot air (not illustrated) and an open lower end for the discharge of hot air. It also comprises a collapsible unmbrella-like structure 36 secured to and around the conduit above the open lower end thereof.

Figure 2:
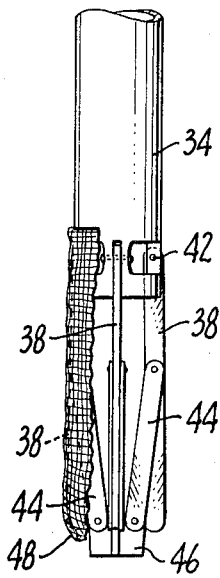
FIG. 2 is an elevational view, with parts thereof broken away, illustrating the collapsible hot air introducing apparatus, in collapsed or closed condition.
Figure 3:
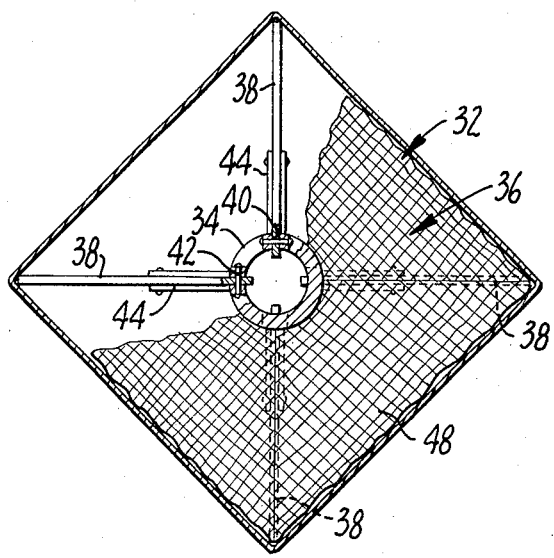
FIG. 3 is a bottom plan view, with parts thereof broken away and shown in section, illustrating the collapsible hot air introducing apparatus of FIG. 2 expanded within a container.
Figure 4:
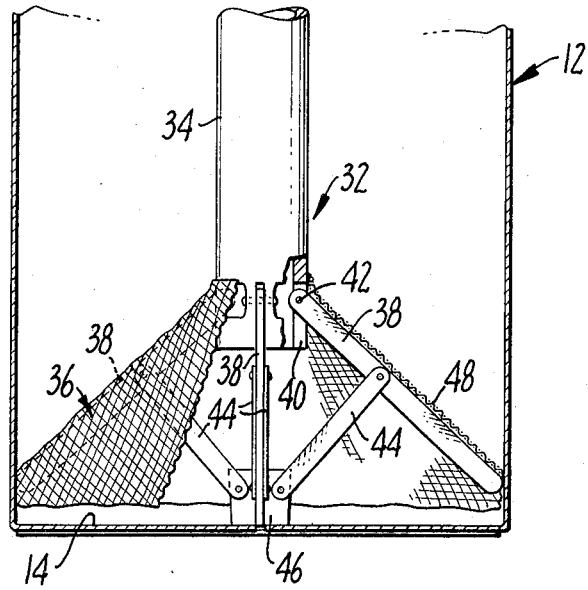
FIG. 4 is an elevational view, with parts thereof broken away and shown in section, illustrating the collapsible hot air introducing apparatus of FIG. 2 expanded within a container, similarly to FIG. 3.

The umbrella-like structure 36 is designed for insertion into the container 12 and selective movement between the collapsed and expanded conditions illustrated in FIGS. 2 and 4, respectively. It comprises: a plurality of ribs 38 pivotally secured in slots 40 provided therefor in the conduit 34 by pins 42; a plurality of downwardly converging links 44 pivotally secured, respectively, to the ribs 38; a bearing block 46 pivotally secured to and interconnecting the inner ends of the links 44; and, a flexible screen or grid 48 secured around the conduit 34 and over the ribs 38 for movement therewith. In the embodiment illustrated, each of the ribs 38 is of unitary one piece construction, while each of the links 44 is comprised of two unitary members disposed in opposed face-to-face relationship on opposite sides of the rib to which it is secured (see FIG. 3). The bearing block 46 is of generally cross shaped configuration.

In operation, the umbrella-like structure 36 automatically assumes the collapsed condition illustrated in FIG. 2 when the conduit 34 is elevated. The force of gravity on the pivotally mounted ribs, links and bearing block provides this automatic operation. Where desired, it may be enhanced by the employment of suitably positioned springs. The slot mountings of the ribs 38 provide for positioning of the structure in downwardly extending substantially longitudinal alignment with the conduit when collapsed. It is also noted that the proportioning of the ribs 38 and links 44 and the location of the connections therebetween provide for positioning of the bearing block 46 beneath the lower extremity of the ribs when the structure is in the collapsed condition. The latter characteristic provides for automatic movement of the structure to the extended condition when the condition conduit is lowered into a container and for the ready collapse of the structure upon its elevation, without the necessity of lifting articles supported thereabove. Specifically, upon lowering of the conduit into a container, the bearing block 46 abuts against the bottom wall of the container and transmits a lifting force to the ribs 38 through the links 44. The ribs 38 are thus elevated to a position which locates the screen 48 in a laterally extending generally conical configuration around the conduit 34 (see FIG. 4). In this configuration, the structure 36 provides a permeable chamber beneath the conduit 34 into which hot air may be introduced for upward distribution through the container. The upper surface of this chamber, defined by the screen 48, provides a temporary floor for the support of articles loaded thereabove in the container. Upon lifting of the conduit 34, this floor collapses to permit removal of the structure through articles received within the container with a minimum of disturbance (see FIG. 1-E).

In the preferred embodiment of the umbrella-like structure 36, the ribs 38 are positioned and proportioned to project to the interior corners of the container 12 upon extension therein. This provides a permeable air receiving chamber over the entire bottom of the container. It is here noted that collapse of the structure 36 upon withdrawal of the conduit 34 through a load of articles received within the container (see FIG. 1-E) is forcefully provided, to a large extent, by the weight of articles bearing on the screen 48. The articles need not, however, be lifted to effect collapse and removal of the umbrella structure. This results because the ribs 38 do not support the umbrella mechanism, but rather the ribs are supported in a position elevated above the bottom of the container at all times by the bearing block 46.

The method of employing the apparatus of FIGS. 1 to 5 for the drying of nodular articles (e.g. hulled in-shell walnuts) is sequentially depicted in FIGS. 1-A to B as follows:

(1) The container 12 is erected from the folded condition illustrated in FIG. 1-A to an upright open top condition as illustrated in FIG. 1-B. Preferably, the container is erected on a pallet as shown.

(2) The hot air introducing apparatus 32 is lowered through the open top of the container as shown in FIG. 1-B to a position wherein the bearing block 46 abuts the bottom of the container to force the umbrella-like structure 36 to the fully expanded condition illustrated in FIG. 1-C.

(3) The nodular articles to be dried are loaded into the container over the structure 36 and around the conduit 34 to a predetermined level beneath the upper extremity of the open container, as seen in FIG. 1-D. The predetermined level is selected so that, upon removal of the hot air introducing apparatus from the container, the articles will settle to a position permitting the upper portion of the container to be folded along the provided crease lines to effect its closure.

(4) Hot air is introduced into the container through the conduit 34 as seen in FIG. 1-D to effect drying of the articles to the desired degree. This air is discharged through the lower end of the conduit and flows therefrom upwardly through the screen 48 and the articles thereabove. As depicted by the wavy lines in FIG. 1-D, the open topped condition of the container permits this air to vent to atmosphere after it passes through the articles.

(5) The apparatus 32 is withdrawn upwardly from the container as shown in FIG. 1-E. During this withdrawal, the structure 36 automatically collapses and the articles settle to the bottom of the container.

(6) The container 12 is closed and sealed to confine the articles therein as seen in FIG. 1-F. This is effected by folding the upper portion of the container along the crease lines provided and sealing it with a suitable adhesive.

(7) An inert or fumigating gas is charged into the sealed container through the valve 24, as seen in FIG. 1-F. During this charging, gas is automatically vented from the upper portion of the container through the check operation of the purging valve 26. The curved arrow lines in FIG. 1-F depict the flow of gas through the container and between the valves. Where this gas is heavier than air, it functions to displace and expel air from the upper portion of the container.

At the termination of these steps, the treatment of the articles for storage within the container 12 is complete. The container may then be employed for the transport and continued storage of the articles in any desired manner. When ready for further processing, it is a simple matter to dump the articles and dispose of the container.

It is noted that prior to opening of the container for dumping, fumigating gas may be purged therefrom by injecting fresh air through the charging valve 24 while simultaneously purging the fumigating gas from the valve 26.

Figure 6:
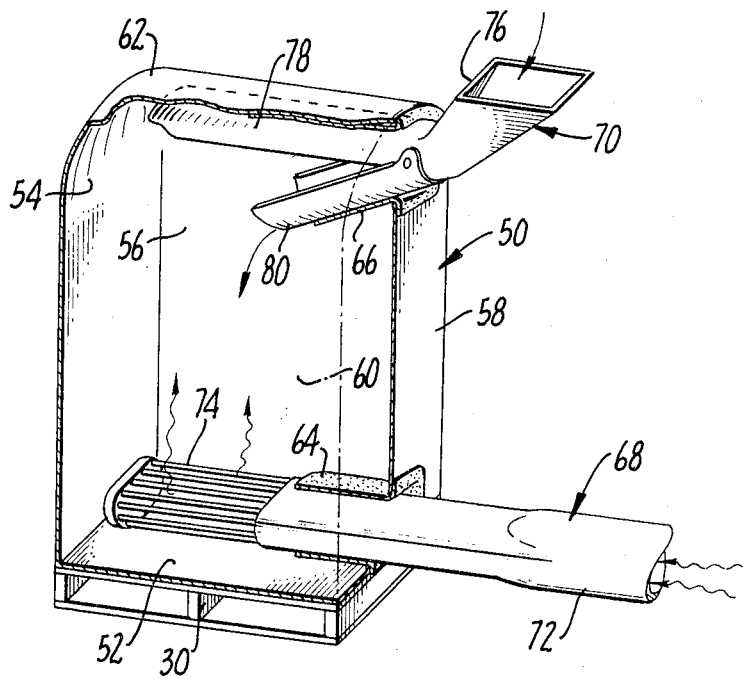
FIG. 6 is a perspective view diagrammatically illustrating a first alternative apparatus to the drying apparatus of FIGS. 1–4.
Figure 7:
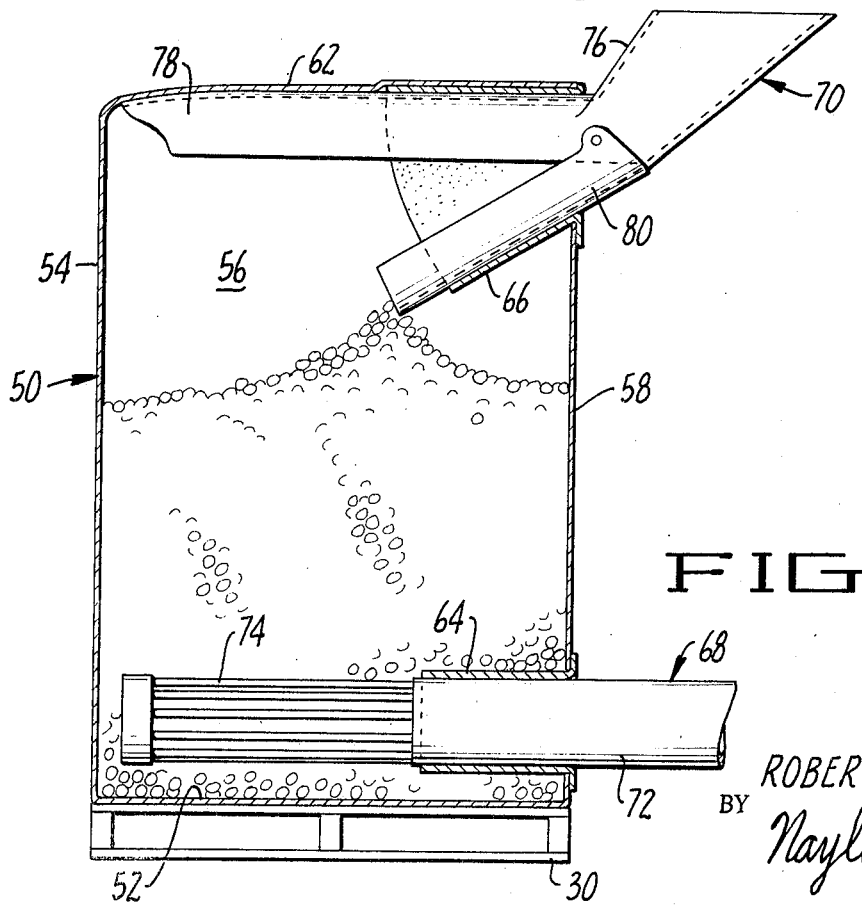
FIG. 7 is an elevational view, in section, of the first alternative apparatus of FIG. 6.

Referring now to the first alternative apparatus illustrated in FIGS. 6 and 7, the container therein, designated by the numeral 50, is also of collapsible bag-like construction. It is preferably fabricated of a material and with proportions corresponding to those suggested for the container 12 and comprises: a bottom wall 52; sidewalls 54, 56, 58 and 60; and a closed top wall 62 formed contiguously between the walls 56 and 60. The only openings into the container 50 comprise sock-like sealing elements 64 and 66 extending through openings therefor provided in the lower and upper portions, respectively, of the side wall 58. The element 64 is provided to sealingly receive a hot air introducing apparatus 50 and permit its insertion into the lower portion of the container 50. The element 66 is provided to receive and permit the insertion of a support and loading apparatus 70 into the upper portion of the container. Both of the elements 64 and 66 also provide for sealing of the openings through which they extend after removal of the respective apparatuses therefrom. This sealing is effected by collapsing the sock-like structure of the elements to a closed condition. Any type of suitable adhesive or tying arrangement may be provided to secure the elements in sealed condition.

In the preferred form, the container 50 is prefabricated and supplied in a folded condition similar to that of the container 12 illustrated in FIG. 1-A, with the exception that the top wall 62 is sealed in closed condition and the element 64 and 66 are provided in an unsealed condition. When the container 50 is prepared for use, it is preferably erected on a conventional pallet. The pallet shown in FIGS. 6 and 7 corresponds to that shown in FIGS. 1-B to C and, accordingly, is also designated by the numeral 30.

The hot air introducing apparatus 68 simply comprises a tubular conduit 72 having an outer end adapted to be secured to a source of forced hot air (not illustrated) and an open inner end provided with a squirrel cage-like grill 74. The grill 74 is secured to the conduit 72 and extends longitudinally thereof. The spaces between the rod-like elements making up the grill are dimensioned so as to permit the free discharge of air therethrough, while preventing the entry of the nodular articles to be dried.

The support and loading apparatus 70 is of clam shell-like construction and comprises a chute 76; a support wall 78 fixed to and extending laterally from the chute; and, a guide wall 80 pivotally secured to the chute beneath the wall 78. The walls 78 and 80 are disposed in substantially opposed relationship and are both of generally frusto-cylindrical configuration. In use, the walls 78 and 80 are collapsed towards each other before insertion into position illustrated in FIGS. 6 and 7. Once inserted, the wall 80 is permitted to swing downwardly under the influence of gravity to the position illustrated. Suitable support structure (not illustrated) is employed to support the apparatus in the elevated position shown and, in turn, support the container through the wall 78. It is noted that the wall 78 passes beneath and in contact with the lower surface of the container wall 62.

The method of the invention is practiced with the apparatus of FIGS. 6 and 7 in substantially the same manner sequentially illustrated in FIGS. 1-A to F, with the following exceptions:

(1) The erection of the container includes the step of inserting the apparatus 70 in place as shown in FIGS. 6 and 7.

(2) The heat introducing apparatus (68) is inserted into the container laterally through the element 64.

(3) The nodular articles to be dried are introduced into the container through the chute 76 and the container is filled to substantially the top. Filling to this degree is permitted because the container 50 does not rely upon folding over of its upper wall portion to effect final sealing.

(4) After drying is complete, both the hot air introducing apparatus 68 and the support and loading apparatus 70 are withdrawn from the container.

(5) Sealing is effected by closing the elements 64 and 66.

(6) Inert or fumigating gas is not introduced into the container 50 after sealing through the provision of valves, such as the valves 24 and 26.

It should be understood that, if desired, valves corresponding to the valves 24 and 26 may be incorporated into the container 50 to facilitate the introduction of inert or fumigating gas thereinto in a manner corresponding to that illustrated in FIG. 1–F. Furthermore, if desired, fumigating or inert gas may be introduced into the container 50 immediately prior to sealing through the apparatus 68.

Figure 8:
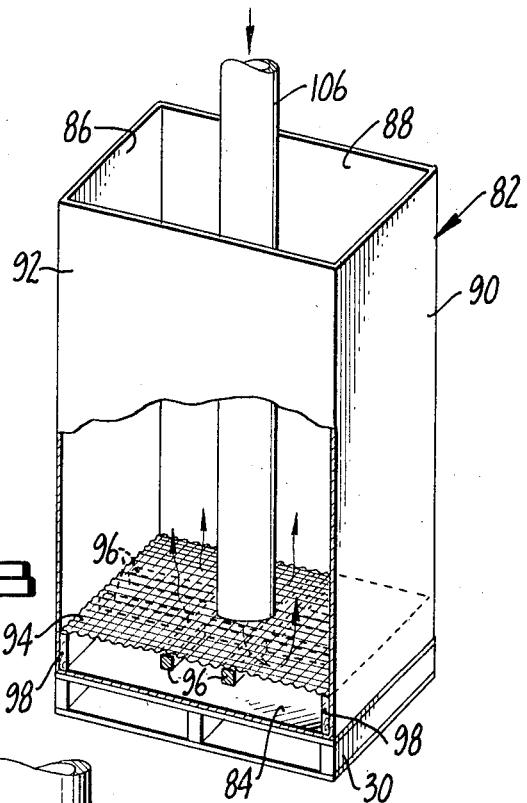
FIG. 8 is a perspective view, with parts thereof broken away, of a second alternative apparatus to the appartus of FIGS. 1–4.
Figure 9:
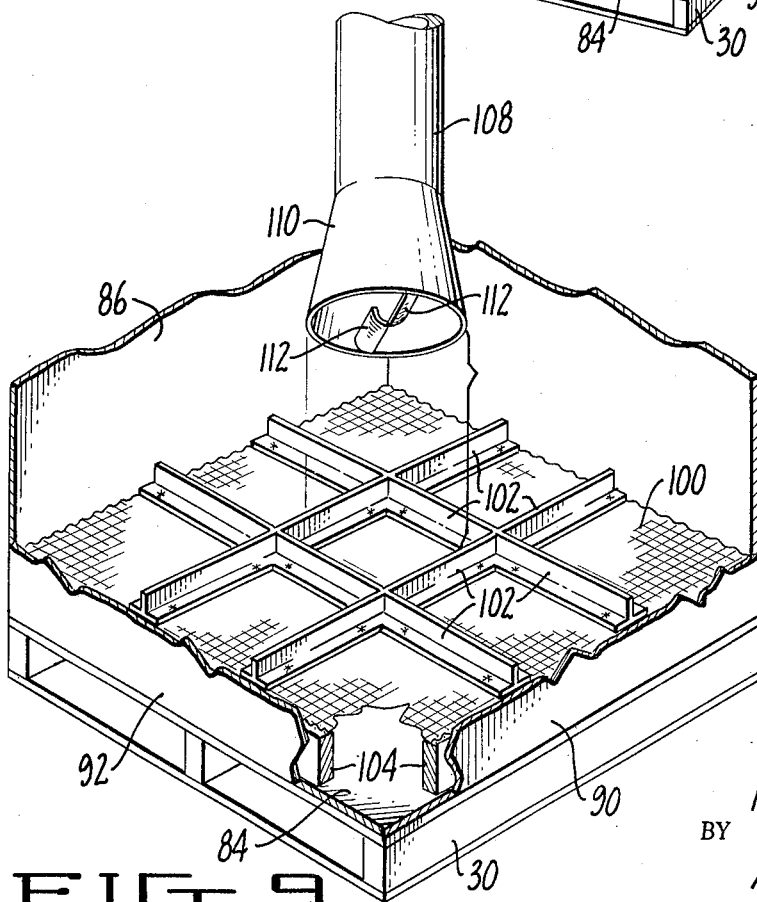
FIG. 9 is a perspective view, with parts thereof broken away and shown in section, of a third alternative apparatus to the apparatus of FIGS. 1–4; and, FIG. 10 is a perspective view of an alternative heating conduit construction adapted for use in the apparatuses of FIGS. 8 and 9.

Referring now to the second and third alternative apparatuses, as seen in FIGS. 8 and 9, these each employ the same container, designated in its entirety by the numeral 82. The container 82 is of carton-like construction and fabricated of a water proof material, such as plastic coated or impregnated cardboard. Ideally, it has dimensions corresponding to those suggested for the container 12 and is prefabricated and supplied in a knocked down folded condition. As shown, the container 82 has a closed bottom wall 84 with closed peripheral side walls 86, 88, 90 and 92 extending upwardly therefrom. The upper end of the container 82 is open and designed to be sealingly closed by a removable top (not illustrated) of conventional construction. It should be understood that when the container 82 is supplied in folded condition, the bottom is made up of conventional flaps. During erection, these flaps are closed and sealed. While the embodiment of the container 82 illustrated suggests the provision of a removable top, it should also be understood that the top could be provided by conventional flaps formed on the upper ends of the side walls.

A pallet, designated by the numeral 30, is shown positioned beneath the containers in FIGS. 8 and 9. While this pallet is illustrated as being of the same conventional construction as the pallets employed in the previously described embodiments, it should be understood that the carton-like construction of the container 82 facilitates the employment of permanently attached pallet structure. Such structure would be attached during the erection of the container and fixedly secured in place to its undersurface. It would have the advantage that the container would always be provided with a pallet for convenience of handling.

The apparatuses of FIGS. 8 and 9 each employ false bottom structures in the bottom of the container employed therein. In the FIG. 8 apparatus, this false bottom structure is made up of a screen 94 supported on a simple wood framework comprised of crossed members 96 and supporting side members 98. The false bottom structure of the FIG. 9 apparatus comprises a screen 100; crossed steel members 102 of T-shaped cross-section spot welded to the upper surface of the screen; and, wooden side members 104 secured beneath the screen. The false bottom structures in FIGS. 8 and 9 may be either removably or fixedly secured in place. When fixedly secured in place the side members thereof provide ideal anchorages for permanently secured pallets.

The heating conduit of the FIG. 8 apparatus, designated by the numeral 106, is tubular and of straight cylindrical configuration. Its lower end is open to permit the discharge of air therethrough and its upper end is adapted to be secured to a source of forced hot air (not illustrated). When employed to dry the contents of the container 90, the conduit 106 is positioned so that its lower end rests against the screen 94, preferably at a central location. In this condition, hot air discharged from the conduit is distributed beneath the screen 94 and flows therefrom upwardly through the container to dry its contents. The heating conduit of the FIG. 9 apparatus, designated by the numeral 108, differs from the conduit 106 only in that its lower end is provided with an outwardly flared portion 110 having air deflecting vanes 112 extending thereacross. The portion 110 is of generally conical configuration and designed to be received between the centrally disposed members 102 to effect placement of the conduit on the screen 100.

Figure 10:
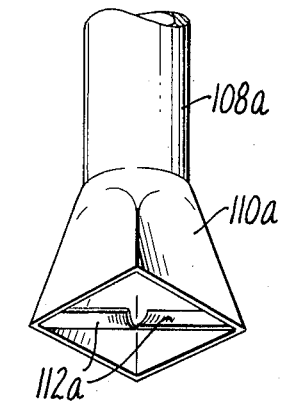

The alternative heating conduit of FIG. 10 is designated by the numeral 108a. This conduit differs from the conduit 108 only in that the flared portion 110a thereof is of rectangular, rather than conical configuration. The vanes in the portion 110a are designated by the numeral 112a. In use, the conduit 108a differs from the conduit 108 only in that the portion 110 is adapted to be more snugly received between the centrally disposed segments of the members 102.

The practice of the method with the apparatuses of FIGS. 8 and 9 corresponds substantially to that sequentially illustrated in FIGS. 1–A to F, with the following exceptions:

(1) During erection, the false bottoms are positioned within the containers.

(2) The heating conduits are placed simply by lowering them against the false bottoms.

(3) The articles to be dried are supported on the false bottom structures. It is noted that the heating conduits are positioned prior to loading and that, accordingly, similarly to FIG. 1–D, the articles surround the conduits.

(4) The heating conduits are withdrawn without the collapse of any special structure and the false bottoms remain in place after withdrawal of the conduits.

(5) Sealing of the dried articles within the containers is effected by covering the containers with a carton-like top. This top may be sealed in place by any suitable means, such as tape or contact adhesive.

(6) No step of charging the containers with an inert or fumigating gas through the provision of valves, such as the valves 24 and 26, is included.

While the exemplary apparatuses of FIGS. 8 and 9 do not include charging and purging valves for the introduction of inert or fumigating gas into the containers employed therein, it is to be understood that these containers may be provided with such valves if desired. Where the valves are provided, the method practiced with the apparatuses of FIGS. 8 and 9 may include a charging step corresponding to that shown in FIG. 1–F.

While the drying gas employed in the various embodiments of the apparatus and method has been described as hot air, it is to be understood that any suitable dehydrating gas might be employed and that, in some instances, the gas might not be heated. It is even anticipated that gases relying on chemical reaction for dehydration might be employed.

From the foregoing description, it is believed apparent that the present invention enables the attainment of the advantages initially set forth herein. It should be understood, however, that the invention is not intended to be limited to the specifics illustrated and described, but rather is defined by the accompanying claims.

What is claimed is:

1. A method of drying and storing nodular articles, comprising:

(a) providing a substantially impermeable container having an open upper portion through which articles may be charged and gas may be vented;

(b) inserting a tubular dehydrating gas conduit having an open discharge end into the container so as to locate said end adjacent the bottom of the container;

(c) introducing the nodular articles into the container through the open upper portion thereof;

(d) introducing dehydrating gas into the container through said conduit whereby gas is discharged through the open discharge end of said conduit and flows upwardly through the nodular articles received in the container and out of the open upper portion thereof;

(e) sealing the container to substantially prevent the ingress of gas thereinto or the egress of gas therefrom.

2. A method according to claim 1, further comprising charging the container with an inert gas after the introduction of dehydrating gas thereinto.

3. A method according to claim 1, further comprising charging the container with a fumigating gas after the introduction of dehydrating gas thereinto.

4. A method according to claim 1, wherein:
(a) the container has closed contiguous bottom and sidewalls;
(b) the dehydrating gas conduit is inserted into the container through the upper portion thereof and, upon insertion, extends substantially vertically within the containers; and
(c) prior to sealing of the container the conduit is withdrawn through the open upper portion thereof in a susbtantially vertical direction.

5. A method according to claim 4, further comprising:
(a) extending a permeable barrier around said conduit above the open discharge end thereof after the lowering of the conduit into the contaner, said barrier being spaced from the bottom wall of the container and being adapted to support nodular articles received in the container thereabove; and
(b) collapsing said barrier around said conduit during the withdrawal of said conduit from said container.

6. An apparatus for introducing gas into a substantially upright container having an open upper portion through which said apparatus may be lowered and a bottom against which said apparatus may seat, said apparatus comprising:
(a) a generally vertically disposed tubular conduit having an upper portion adapted to be secured in fluid communication with a source of gas and an open lower portion through which gas may be discharged therefrom; and
(b) a fluid permeable umbrella concentrically secured to and extending around said conduit above the open lower portion thereof, said umbrella being selectively moveable between an open condition extending laterally from said conduit and a closed condition extending downwardly and longitudinally thereof.

7. An apparatus according to claim 6, wherein said umbrella comprises:
(a) a plurality of ribs, each of said ribs being secured to said conduit above the open lower portion thereof for pivotal movement between a first position extending laterally of said conduit when said umbrella is in the open condition and a second position extending downwardly and substantially longitudinally of said conduit when said umbrella is in the closed conditions;
(b) flexible screen means disposed over said ribs for movement therewith between said first and second positions, said screen means extending from said conduit to define an annular barrier therearound above the open lower portion thereof; and
(c) means operatively associated with said ribs to selectively effect the simultaneous movement thereof between said first and second positions.

8. An apparatus according to claim 7, wherein said means operatively associated with said ribs comprises:
(a) a plurality of links, said links being pivotally secured, respectively, to each of said ribs intermediate the ends thereof and extending downwardly therefrom in converging relationship relative to each other; and
(b) a bearing block pivotally secured to the converging distal ends of said links at a position beneath said conduit, said block being disposed for abutting engagement with the bottom of a container within which said apparatus is lowered to:
(1) upon lowering of said apparatus, force said links upwardly and said ribs to said first position; and
(2) upon lifting, permit said ribs to move to said second position.

9. In a container having a closed bottom wall with a substantially impermeable peripheral wall secured thereto and extending upwardly therefrom, an improvement to provide for the introduction of gas into said container from a tubular conduit extended thereinto from above and the distribution of said gas through a load of nodular articles contained within said container, said improvement comprising:
(a) a fluid permeable grid disposed within said container and extending transversely thereacross for the support of a load of nodular articles received within said container;
(b) a conduit receiving area on said grid adapted to receive the open end of a gas conduit extended into said container from above and permit gas to be discharged therethrough from said conduit; and
(c) means supporting said grid within said container in spaced relationship to the bottom wall thereof.

References Cited

UNITED STATES PATENTS

| 245,096 | 8/1881 | Smith | 34—243 X |
| 1,584,155 | 5/1926 | Trost | 34—243 |
| 1,647,863 | 11/1927 | Galbraith | 34—243 X |
| 1,829,139 | 10/1931 | Henderson | 34—46 X |
| 2,049,812 | 8/1936 | Loacker | 34—243 X |

LLOYD L. KING, Primary Examiner

U.S. Cl. X.R.

34—34, 46, 243